United States Patent Office 3,173,792
Patented Mar. 16, 1965

3,173,792
METHOD OF OBTAINING DETOXIFIED MEAL FROM SEEDS CONTAINING BOTH ISOTHIO-CYANATE AND THIOOXAZOLIDONE
Gus C. Mustakas, Peoria, and Larry D. Kirk, East Peoria, Ill., assignors to the United States of America as represented by the Secretary of Agriculture
No Drawing. Filed Mar. 2, 1962, Ser. No. 177,128
3 Claims. (Cl. 99—2)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to a method of processing the seeds of Crambé abyssinica to remove known metabolic toxicants and provide an excellent source of palatable protein having use as a basic feed for livestock.

It is known that the seeds of Crambé abyssinica in common with the seeds of other members of the mustard family (Brassicaceae) genus Cruciferae contain enzyme-susceptible thioglucosides which are also hydrolyzed by enzymes of the gastrointestinal tract to free the volatile isothiocyanate oils. In addition the seeds of Crambé abyssinica and those or rapeseed also contain another thioglucoside that upon hydrolysis represents as much as one percent of a nonvolatile cyclic compound, namely 5-vinyl-2-thiooxazolidone ("goitrin"), which has marked goitrogenic activity that is not overcome by feeding supplemental iodine.

The work of others at this laboratory on extracting the hexane-defatted Crambé mean with aqueous solutions of organic solvents such as acetone and lower alcohols has shown that increasing amounts of the thiooxazolidone-containing glucoside are removed as the alcohol content of the alcoholic solvent is raised from a level of about 75 percent to about 95 percent but that concomitantly up to about 33 percent of the protein solids are also removed from the meal.

The principal object of our invention is the provision of a method of treating the thiooxazolidone-containing seeds of Crambé abyssinica and rapeseed in a commercially-practical manner to hydrolyze and/or remove not only the volatile isothiocyanate constituents but also the nonvolatile thiooxazolidone constituent and thus provide a harmless and highly nutritious feed for animals, especially livestock.

Another object is the provision of a commercially adaptable method for detoxifying seeds of Crambé abyssinica without significant loss of meal solids so as to provide a maximal return to the processer.

Still another object is the provision of a method in which the commercially valuable volatile isothiocyanate (mustard oil) is recovered as well as the triglyceride oil content of the seeds.

The above and other objects will become clearer in the course of the following detailed presentation and appended claims.

In applicants' copending application Serial No. 73,465, filed December 2, 1960 (now Patent No. 3,105,469, we have disclosed a method of obtaining detoxified mustard seed meal comprising the steps of grinding the seeds to a very fine meal, heating the meal at about 50° C. in the presence of a critical amount (about 15–18 percent) of added moisture in the further presence of added enzyme-containing freshly ground meal to release the volatile oil, increasing the temperature to about 115° C. so as to cook, rupture cells, and distill off the enzyme-hydrolyzed isothiocyanate, hexane-extracting the screened cooked meal, and steaming to remove any traces of mustard oil. The said copending application also stresses the criticality of not exceeding a water content of about 16 to 18 percent to avoid gum release that would very seriously hamper the simple filtration and drying steps that are essential for an economical industrial employment of the process.

Although the method of the copending application is entirely effective for mustard seed, it is only partially useful with Crambé abyssinica and rapeseed in which the additional presence of about 1 percent by weight of nonvolatile 5-vinyl-2-thiooxazolidone constituent requires a substantially higher moisture content, i.e., about 30 percent, thereby preventing the use of a finely ground meal which at that moisture content forms a sludge of released gums, mucilages, etc. that greatly interferes with subsequent filtration and drying steps.

In accordance with the objects of our invention we have now discovered a process wherein substantially total recovery of a toxicant-free, bland, high protein content animal feed with corresponding recoveries of bland triglyceride oil and volatile isothiocyanate can be achieved by first dehulling Crambé abyssinica seeds to improve the efficiency of the subsequent enzymatic hydrolysis and also to raise the content (proportion) of triglyceride oil from a value of about 40 percent to a value of about 46 percent (moisture-free basis) and the protein from the level of 40 percent to a value of 51 percent and then further treating the dehulled seeds as follows:

The dehulled seeds (endosperm) are tempered to about a 10 percent moisture content to permit flaking between rollers. Additional tempering moisture is then added in a mixing chamber to provide a total moisture content of about 30 percent and an enzyme-activating temperature of 50° C. is applied for about 15 minutes to permit enzymatic hydrolysis of the thioglucosides. Then the temperature in the mixing chamber is raised to 100° C. by indirect steam while injecting sparge steam at the bottom of the chamber. After about 30 minutes the sparge steam is cut off and the indirect heating continued for a few minutes to lower the moisture content. The hot meal containing about 19 percent moisture is rapidly air-cooled, forming crisps having a residual moisture content of 12 to 14 percent, a zero thiooxazolidone content, and from zero to 0.005 percent residual isothiocyanate. The readily frangible crisps are screen-reduced, slurried in hexane to remove the triglyceride oils, and the high quality protein product having a residual lipid content of 1 to 3 percent is recovered by simple filtration. The seed oil is recovered from the solvent by stripping and then freed of any trace of contaminant isothiocyanates by conventional bleaching and deodorization steps.

It is pointed out that a hydrolysis period of 15 minutes is essential and that a substantially extended hydrolysis is detrimental inasmuch as we have found that the glucoside-released isothiocyanates can react with certain of the protein groups and also spontaneously decompose. Once it has reacted with available protein groups or has begun to decompose, the isothiocyanates can no longer be removed by steam distillation and are therefore carried along to the final product.

*Example 1*

Crambé abyssinica seed (5200 gm.) was cracked between corrugated rolls, dehulled by aspiration, tempered to 9 percent moisture, and rolled between smooth rolls to produce flakes having an average thickness of .002–.005 inch. About 4000 gm. of the flakes were charged to a converter-cooker equipped with an agitator to provide thorough mixing. While stirring the charge at room temperature, moisture was added to provide a total moisture content of 30 percent. The moist flakes were heated to 50° C. (130° F.) and held at this temperature for 15 minutes to promote enzymatic hydrolysis of the thioglycosides to thiooxazolidone and isothiocyanates. At the end of this period, open steam was added to the charge through a perforated coil sparger and at the same time heat was applied indirectly through a jacket containing steam at 30 p.s.i.g. The charge was steamed for 30 minutes and then dried to approximately 19 percent moisture using indirect heat only. After removing the charge and cooling with air, the crisped material was passed through smooth rolls twice at 0.001 inch clearance and was then subjected to a miscella extraction with hexane for removal of the triglycerides. The slurry was then filtered and the cake was washed successively with hexane washes containing 5, 1, and 0 percent oil content, each weighing 5200 grams. After addition of the final wash the cake was drained under vacuum for 10 seconds and air-dried to produce approximately 2200 grams of meal. Whereas the untreated raw meal had analyzed 0.058 percent of isothiocyanate (calculated as allyl isothiocyanate) and 0.897 of 5-vinyl-2-thiooxazolidone, the detoxified meal analyzed 0.005 percent and 0.000 respectively.

We claim:

1. A method of obtaining a detoxified animal feed-meal from seeds containing both a thioglucoside containing volatile allyl isothiocyanate and a thioglucoside containing nonvolatile 5-vinyl-2-thiooxazolidone, comprising dehulling the seeds to yield the endosperms, tempering the endosperms to a moisture content of about 10 percent, rolling the tempered endosperms to form flakes having an average thickness of 0.002–0.005 inch, tempering the flakes to a moisture content of about 30 percent, heating the moist flakes at an enzyme-activating temperature of 50° C. for about 15 minutes to effect enzymatic hydrolysis of both of the said thioglucosides with liberation of the volatile allyl isothiocyanate and the nonvolatile 5-vinyl-2-thiooxazolidone, heating the resulting mixture at 100° C. with both indirect and direct steam for about 30 mintues, continuing only the indirect heating to lower the moisture content to about 19 percent, rapidly cooling the resulting hot meal with air to form crisps having a residual moisture content of about 12 to 14 percent, a zero 5-vinyl-2-thiooxazolidone content, and from zero to 0.005 percent residual allyl isothiocyanate, screening to break up the crisps, solvent-extracting the constituent triglycerides, and removing the triglyceride-containing solvent.

2. The method of claim 1 wherein the seeds are those of *Crambé abyssinica*.

3. The method of claim 1 wherein the seeds are those of rapeseed.

References Cited by the Examiner
UNITED STATES PATENTS
2,987,399  6/61  Goering.

A. LOUIS MONACELL, *Primary Examiner.*